Dec. 28, 1965  E. C. WARD ET AL  3,225,590
METHOD AND APPARATUS FOR LOCATING THE CENTER OF GRAVITY
Filed Aug. 31, 1961  4 Sheets-Sheet 1
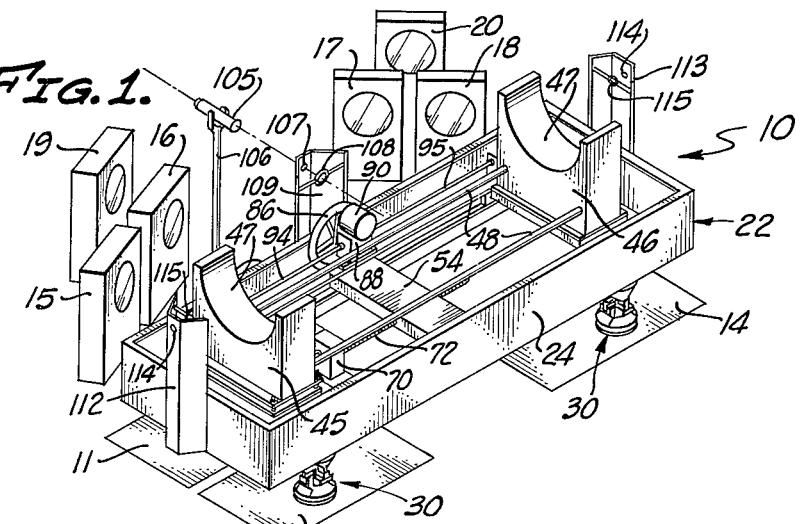
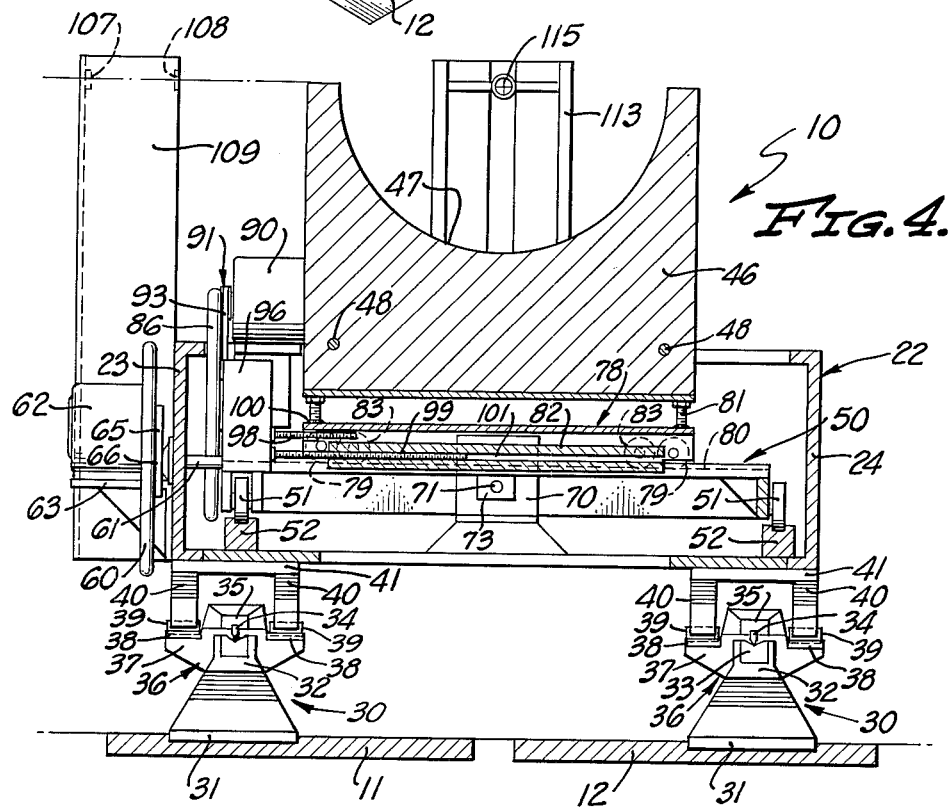
INVENTORS
EARL C. WARD,
ERICH L. WOLF
BY
Herbert E. Fidder
AGENT

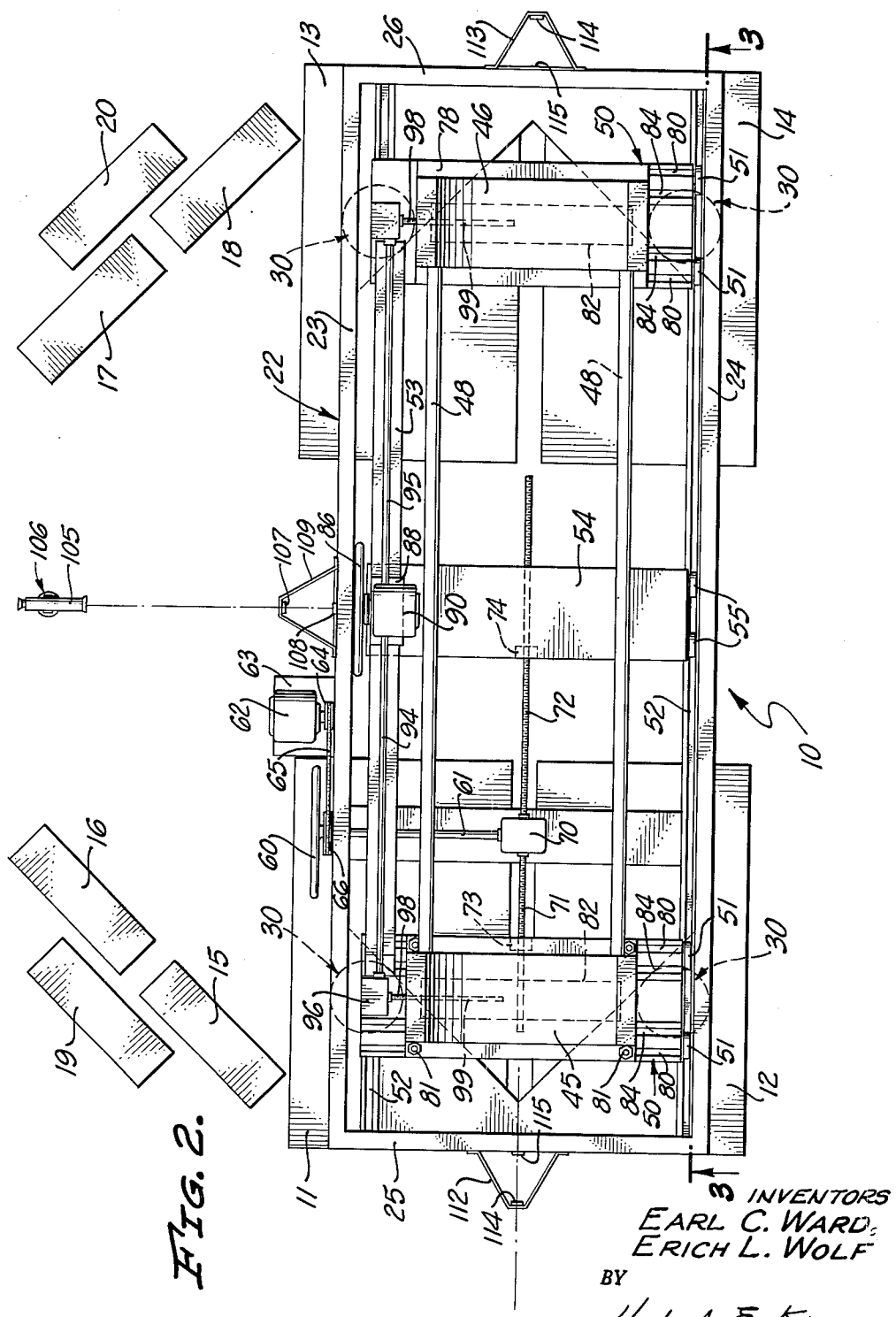

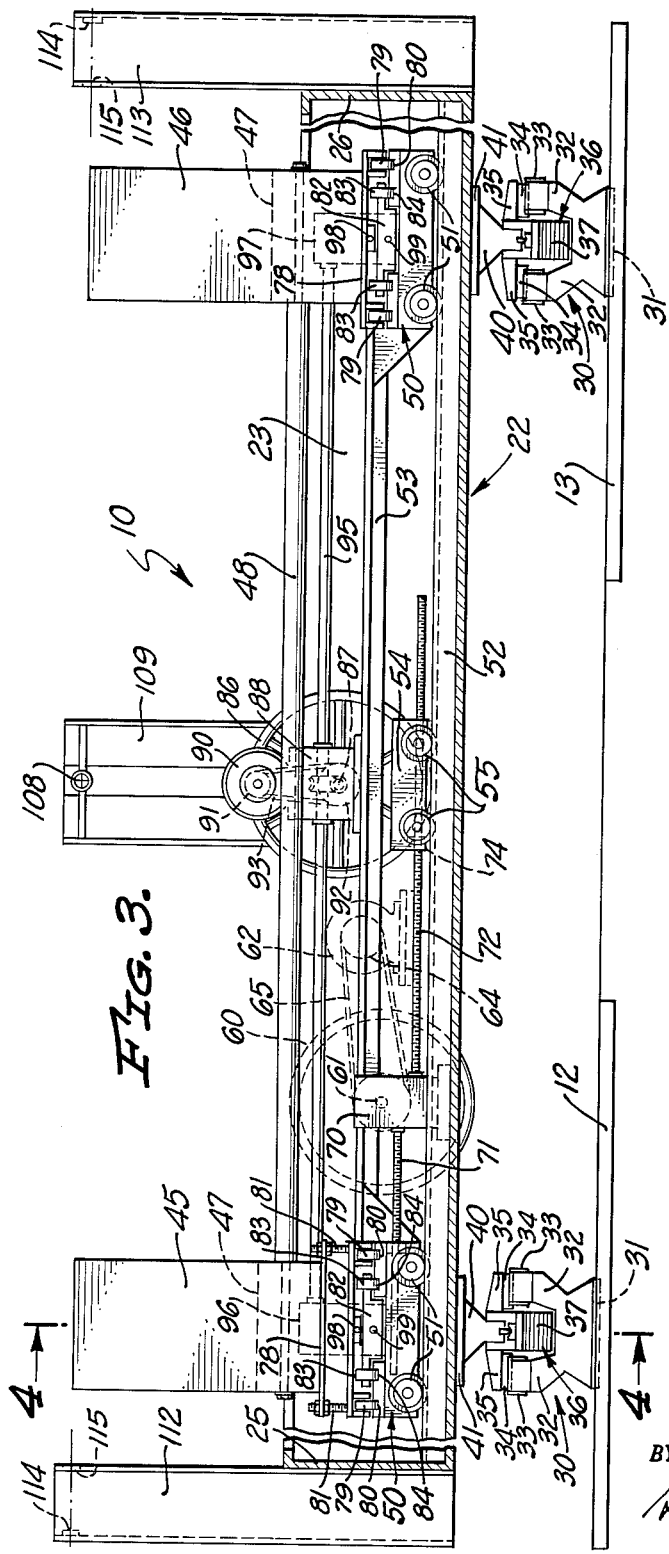

Dec. 28, 1965  E. C. WARD ET AL  3,225,590
METHOD AND APPARATUS FOR LOCATING THE CENTER OF GRAVITY
Filed Aug. 31, 1961  4 Sheets-Sheet 4
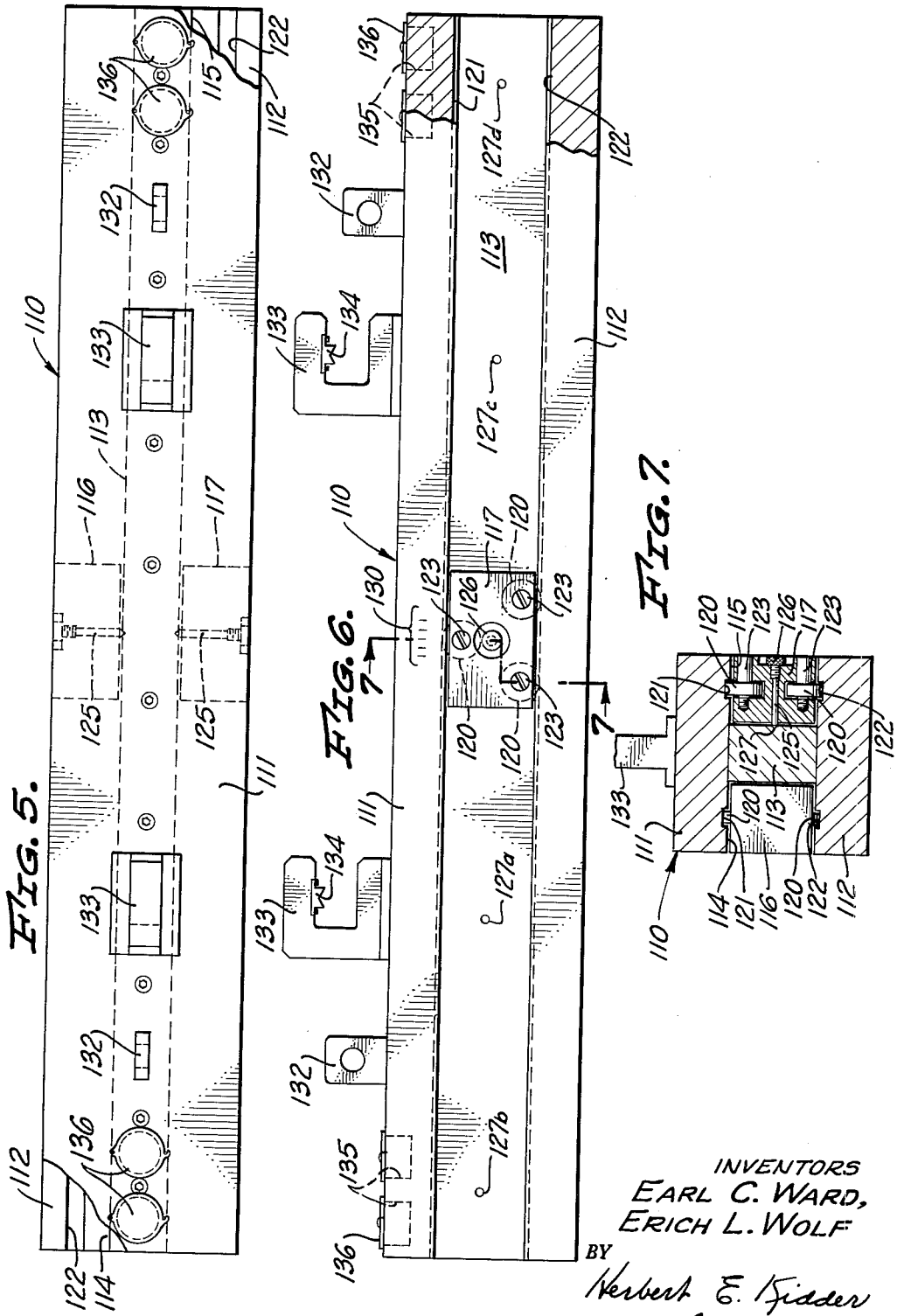
INVENTORS
EARL C. WARD,
ERICH L. WOLF
BY
Herbert E. Kidder
AGENT

United States Patent Office 3,225,590
Patented Dec. 28, 1965

3,225,590
METHOD AND APPARATUS FOR LOCATING THE CENTER OF GRAVITY
Earl C. Ward, 20437 Harvard Way, and Erich L. Wolf, 4071 Overland St., both of Riverside, Calif.
Filed Aug. 31, 1961, Ser. No. 135,220
6 Claims. (Cl. 73—65)

The present invention relates to a method and apparatus for locating the center of gravity of a rocket powered missile, or the like, and its primary object is to provide a new and improved apparatus for determining the location of the center of gravity of such a missile with extreme accuracy along both the longitudinal and transverse axes thereof.

As rocket powered missiles become larger and longer ranged, the required accuracy of guidance and control becomes increasingly more precise, which necessitates that the exact location of the center of gravity be known with extreme accuracy. Heretofore, the center of gravity of a missile has been determined either by mathematical computation, or by suspending the missile from cables. While the determination of center of gravity by mathematical computation is theoretically accurate, it is subject to considerable error due to manufacturing tolerances and slight variations in the density or homogeneity of the solid propellant. These variations make it necessary to locate the center of gravity accurately by physical means after the missile has been completely assembled, so that any deviation from the computed center of gravity can be corrected for. However, as the missiles become larger and heavier, the problem of locating the center of gravity by physical means becomes increasingly more difficult.

Another object of the invention is to provide an apparatus of the class described which, in one operation, locates the center of gravity of a missile and simultaneously give the total weight thereof, thereby eliminating a separate weighing operation.

A further object of the invention is to provide an apparatus of the class described, which can be operated manually or automatically to locate the center of gravity of the missile first along the longitudinal axis thereof, and then along its transverse axis.

Another object of the invention is to provide a center of gravity locater which requires no particular skill or experience on the part of the operator of the machine, which is extremely simple and speedy to operate, and which gives readily reproducible results.

Still a further object of the invention is to provide an apparatus of the class described which is relatively low in initial cost, easy and inexpensive to maintain, and which can be equipped with printers for automatically recording the various weights.

These objects are achieved in the present invention by means of apparatus comprising a cradle for supporting the missile, the said cradle being mounted on a stationary platform for movement parallel to the longitudinal axis of the missile, and also transversely with respect thereto. The stationary platform is supported by knife edges, or the equivalent, on the platforms of a plurality of scales which are spaced apart along both the longitudinal and transverse axes of the missile. In the preferred embodiment of the invention illustrated herein, there are four scale platforms arranged in two pairs, spaced apart along the longitudinal axis of the missile, and disposed symmetrically on opposite sides thereof. The missile-supporting cradle is counter-balanced by movable weights which are shifted in the direction opposite the movement of the cradle at a rate such that the center of gravity of the missile-supporting cradle remains constant, regardless of any shift in position of the cradle.

The apparatus is so arranged and constructed that the longitudinal location of the center of gravity of the missile can be found first by shifting the missile-supporting cradle one way or the other until the sum of the scale readings for the pair of platforms at one end of the missile is exactly equal to the sum of the scale readings for the pair of platforms at the other end thereof. With the weight of the missile thus distributed equally between the two pairs of scale platforms at opposite ends thereof, the longitudinal position of the center of gravity of the missile is located on the side of the missile by optical means located exactly midway between the transverse knife edges or their equivalent.

The missile-supporting cradle is then shifted transversely with respect to the longitudinal axis of the missile, until the scale readings of the two platforms in each pair read exactly alike. At this point, the transverse position of the center of gravity of the missile is located on one end of the missile by optical means located exactly midway between the longitudinally extending knife edges or their equivalent at that end of the apparatus. The missile may then be turned 90° in its cradle to obtain a second transverse location of the center of gravity in the plane perpendicular to the plane of the first transverse location. The sum of the scale readings gives the total weight of the missile, which may be read off visually, or printed on a record.

As with any other precision apparatus of this type using platform scales, it is necessary periodically to check the accuracy of the machine to make absolutely certain that no error has crept in due to corrosion, damage, dirt, or any other cause, and another object of the invention is to provide a device for quickly and easily checking the accuracy of our center of gravity locator. This aspect of our invention comprises a testing beam which can be placed upon the cradle to simulate a missile, the said testing beam having longitudinally movable weights that can be shifted to various stations, thereby shifting the center of gravity of the beam to certain known positions which are accurately marked on the beam. The test beam is placed in the cradle, with the movable weights in one position, and the apparatus is operated to locate the center of gravity. If the location determined by the apparatus coincides exactly with the corresponding center of gravity mark on the beam, the accuracy of the apparatus is known to be within specifications. The test is then re-run, with the weights moved to the different stations, and in each case the center of gravity location indicated by the apparatus is checked directly against a known center of gravity mark on the beam.

The foregoing and other objects and advantages of the present invention will become apparent to those skilled in the art upon consideration of the following detailed description of the preferred embodiment thereof, reference being had to the accompanying drawings, wherein:

FIGURE 1 is a perspective view of an apparatus embodying the principles of the present invention, for locating the center of gravity of a missile or the like;

FIGURE 2 is a top plan view of the same;

FIGURE 3 is a sectional view, taken at 3—3 in FIGURE 2;

FIGURE 4 is a transverse sectional view, taken at 4—4 in FIGURE 3;

FIGURE 5 is a top plan view of a testing beam for checking the accuracy of the apparatus shown in FIGURES 1 to 4;

FIGURE 6 is a side elevational view of the same; and

FIGURE 7 is a transverse sectional view, taken at 7—7 in FIGURE 6.

FIGURES 1 to 4 of the drawings show that portion of our invention relating to the apparatus for locating the center of gravity of an object. The apparatus is designated in its entirety by the reference numeral 10, and comprises two pairs of scale platforms 11, 12 and 13, 14, which are arranged in a rectangular pattern, as best shown in FIGURE 2. Scale platforms 11 and 12 are disposed at one end of the rectangle, and scale platforms 13 and 14 at the other end thereof. Associated with the scale platforms 11 and 12 are weighing and indicating mechanisms 15 and 16, respectively; while platforms 13 and 14 have weighing and indicating mechanisms 17 and 18 respectively. Preferably, in addition to the said weighing and indicating mechanisms, there are also two totalizer mechanisms 19 and 20, the first of which gives the sum total of the weights carried on the scale platforms 11 and 12, while the second gives the sum total of the weights carried by the scale platforms 13 and 14. Each of the mechanisms 15, 16, 17, 18, 19 and 20 is preferably of the type having a visual read-out, such as a pointer moving over a dial graduated in units of weight; and is also preferably provided with a printing mechanism for printing the weight on a record card when the apparatus is in balance, so as to record the total weight on each scale platform.

Disposed above and generally parallel to the rectangular pattern of the scale platforms 11, 12, 13, 14 is a rectangular platform 22 having lengthwise extending sides 23, 24 and transversely extending ends 25 and 26. As best seen in FIGURE 2, the platform 22 is symmetrically arranged with respect to the rectangular pattern of the scale platforms 11, 12, 13 and 14. Accordingly, the longitudinal axis of the platform 22, which may be defined as a line parallel to the sides 23, 24 and midway between them lies directly over and is parallel to longitudinal axis of the rectangular pattern of scale platforms 11, 12, 13 and 14, which may be defined as a line extending midway between the scale platforms 11 and 12 at one end, and platforms 13 and 14 at the other end thereof. In like manner, the transverse axis of the platform 22 lies directly over and is parallel to the transverse axis of the rectangular pattern of scale platforms.

The platform 22 is supported at its four corners on the scale platforms 11, 12, 13 and 14 by unique fulcrum means 30, which are illustratively shown as dual knife-edge supports. Each of the fulcrum means 30 includes a base 31, mounted upon its respective scale platform. Projecting upwardly from the base 31 are two horizontally spaced arms 32 carrying aligned, V-notched bearing blocks 33. Aligned knife edges 34 rest in the V-notches of the bearing blocks 33, and these knife edges are mounted in arms 35 projecting in opposite directions from a member 36. Member 36 is generally cruciform, as seen from above, and the center portion of the member 36 hangs downwardly between the arms 32, and has oppositely projecting arms 37, which are disposed perpendicular to the arms 35. Mounted on the top sides of the arms 37 are longitudinally aligned V-notched bearing blocks 38, and resting in the V-notches of these blocks are knife edges 39, which are mounted on the bottom ends of two laterally spaced legs 40. The legs 40 are integral with a mounting plate 41, which is attached to the under side of the platform 22.

The knife edges 34 and 39 lie in the same horizontal plane and are perpendicular to one another; hence, the effect of this arrangement is to provide a single point of support at the intersection of the knife edges. Each of the fulcrum means 30 thus functions in the manner of a gimbal, permitting the upper member 41 to tilt in either direction with respect to the lower member 31. The fulcrum means 30 is not necessarily restricted to a knife edge support, but could also be in the form of antifriction bearings, or the like.

Mounted upon the platform 22 for movement parallel to the longitudinal axis thereof are two object-supporting means, or pillow blocks 45 and 46, each of which has a cylindrically curved seat 47 provided in its top side to receive and hold a rocket motor, missile, or the like. The two pillow blocks 45, 46 are disposed near the ends of the platform 22, and are normally located directly above the fulcrums 30, as shown in FIGURE 3. The pillow blocks are connected together by two laterally spaced, parallel tie rods 48, and therefore move as one along the longitudinal dimension of the platform 22.

Each of the pillow blocks 45, 46 rests upon and is carried by a truck 50 having four wheels 51 at the corners thereof, which run in channel tracks 52. The tracks 52 are mounted on the frame 22 closely adjacent the side 23, 24 and parallel thereto. The two trucks 50 are rigidly connected together adjacent side 23 by an angle iron beam 53, which maintains the trucks at the same spacing with respect to one another as the spacing between the pillow blocks 45, 46. Also mounted on the frame 22 and movable along the longitudinal axis thereof is a counterweight 54, the purpose of which is to counterbalance the shift in the center of gravity of the apparatus 10 due to the shift in position of the trucks 50 and associated pillow blocks 45, 46, as the apparatus is adjusted. The counterweight 54 is a flat, rectangular body of cast iron, or the like, extending transversely across the frame 22 from one side thereof to the other between the trucks 50. Wheels 55 are journaled on the ends of the counterweight 54, and these run in the tracks 52. Preferably the weight of the counterweight 54 is exactly half the combined weight of the two trucks 50 together with the pillow blocks 45, 46 and all other parts carried on the trucks.

The trucks 50 and counterweight 54 are shifted along the tracks 52 of the platform 22 by means of actuating mechanism consisting of a hand wheel 60 mounted on the laterally projecting end of a transverse drive shaft 61, and a motor 62 mounted on a bracket 63 attached to the outside of platform member 23. The motor 62 may be air-driven, hydraulic, or electric, and is preferably of the type having an integral gear reduction drive, terminating in a driving pulley 64 which is connected by a V-belt 65 to a driven pulley 66 on the shaft 61 just inside the hand wheel 60. The pulley 66 is preferably equipped with a clutch (not shown) so that the motor can be disconnected when the shaft 61 is turned by the hand wheel 60.

At its inner end, the drive shaft 61 is operatively connected to a gear box 70 having two leadscrews 71 and 72 projecting from opposite sides thereof, parallel to the longitudinal axis of the frame 22. Leadscrew 71 is threaded through a nut 73 fixed to the underside of the left-hand truck 50 carrying pillow block 45; while the other leadscrew 72 is threaded through another nut 74 fixed to the underside of the counterweight 54. The threads of the leadscrews 71, 72, and the directions of their rotations are such that the two trucks 50 are moved in one direction, and the counterweight 54 is simultaneously moved in the opposite direction at twice the rate of speed of the trucks. This may be accomplished by making the threads of the two leadscrews 71, 72 of the same direction, and driving the leadscrews in opposite directions of rotation; or by making the leadscrews with one of right-hand thread and the other of left-hand thread and driving both leadscrews in the same direction of rotation. Also, the two leadscrews 71, 72 may be of the same pitch, in which case leadscrew 72 would be driven at twice the speed of leadscrew 71; or leadscrew 72 might be made with twice the pitch of leadscrew 71, and the two leadscrews driven at the same rotational speed. Since the counterweight 54 is half the combined weights of the trucks 50 and their associated pillow blocks 45 and 46, and the counterweight is driven in the opposite direction at twice the rate of speed as the trucks, the center of gravity of the apparatus, itself, remains unchanged when the trucks and pillow blocks are shifted along the length of the frame 22. Thus, the weight "seen" by the platform scales 11, 12, 13 and 14 remains constant for any shift in position of the trucks and pillow blocks, by themselves, and the only change in weight registered on the mechanisms 15, 16, 17, 18, 19 and 20 is that due to the shifting of the weight of the object carried on the pillow blocks. The scale mechanisms 15, 16, 17, 18, 19 and 20 are preferably calibrated to read zero when the pillow blocks 45, 46 are empty, so that the weight indicated on the mechanisms is the net weight of the object, with no tare for the weight of the apparatus 10.

In addition to being movable longitudinally of the frame 22, the pillow blocks 45, 46 are also movable transversely thereof. This is accomplished by mounting each of the pillow blocks on a small platform 78 having wheels 79 at the four corners thereof, which run in tracks 80 extending transversely across the top of the truck 50. The left-hand pillow block 45 is supported on its platform 78 by four leveling screws 81, which permit the pillow block to be raised or lowered slightly so as to level the missile or rocket motor supported on the apparatus. Also mounted on each of the platforms 78 and movable transversely with respect thereto is a counterweight 82 having four wheels 83 which run in tracks 84. The tracks 84 are disposed between and parallel to the tracks 80, and the pillow blocks 45, 46 and their respective counterweights are thus movable along parallel paths, transverse to the longitudinal axis of the platform 22.

The platform 78 is moved in one direction along the tracks 80, and the counterweight 82 is simultaneously moved in the opposite direction along the tracks 84 by actuating means consisting of a hand wheel 86 mounted on the end of a stub shaft 87 (see FIGURE 3) projecting from one side of a gear box 88. The gear box 88 is mounted on the single iron beam 53 at approximately the midpoint thereof, and the hand wheel 86 is located just inside the platform side member 23. Standing on top of the gear box 88 and fixed securely thereto is a motor 90 of the type having integral speed reduction gears driving a pulley 91. The motor 90 may also be air driven, hydraulic or electric. Another pulley 92 mounted on the stub shaft 87 between the hand wheel 86 and gear box 88, is driven from the pulley 91 by a V-belt 93. The pulley 92 is preferably connected to the stub shaft 87 by a friction clutch (not shown) so that the hand wheel 86 can be used to overpower the motor 90.

Extending in opposite directions from the gear box 88, parallel to the longitudinal axis of the frame 22, are two drive shafts 94 and 95, the outer ends of which project into gear boxes 96 and 97, respectively, and are operatively connected to the gears contained therein. Each of the gear boxes 96 and 97 has two vertically spaced, parallel leadscrews 98 and 99 projecting laterally therefrom, between the platform 78 and the truck 50. As shown in FIGURE 4, the top leadscrew 98 is threaded through a nut 100 fixed to the underside of the platform 78, while the bottom leadscrew 99 is threaded into a tapped hole 101 extending transversely through the counterweight 82. The threads of the two leadscrews 98, 99, both as to pitch and direction of rotation, are such that the platform 78 is moved in one direction, while the counterweight 82 is moved in the opposite direction the distance required to bring the counterweight into exact balance with the empty weight of the platform 78 for any adjusted position of the latter. Preferably, although not necessarily, the counterweight 82 is half the weight of the platform 78, and is therefore moved twice the distance of the latter. As in the case of the previously described leadscrews 71 and 72, this may be accomplished by using threads of opposite hand, or by driving the leadscrews in opposite directions; and by driving the leadscrews 99 twice as fast as leadscrew 98, or using a thread on leadscrew 99 having twice the pitch of the thread on leadscrew 98.

The mechanism described to this point is operable to shift the pillow blocks 45 and 46 both longitudinally and transversely with respect to the platform 22 so that a missile resting on the pillow blocks is positioned with its weight evenly distributed between both the longitudinally spaced pairs of scale platforms 11, 12 and 13, 14, and the laterally spaced pairs of scale platforms 11, 13 and 12, 14. When the missile is thus balanced evenly upon the scale platforms, the center of gravity of the missile is located exactly midway between the opposed pairs of knife edges.

The exact location of the center of gravity of the missile is pinpointed on the side of the missile by locating means, preferably of an optical nature, as in the illustrated embodiment, although it might also take the form of a scriber or other marker. The optical mean shown in the drawings consists of a transit telescope 105 mounted upon a supporting post or tripod 106, which is sighted through two reticle rings 107 and 108, mounted on a frame 109. The frame 109 is a generally V-shaped structure of sheet or plate steel, attached to the outer side of the frame member 23 and rising vertically therefrom. The frame 109 is centered between the two pairs of transversely disposed knife edges 39 on the fulcrums 30 of scale platforms 11, 12 at one end, and 13, 14 at the other end, and the crossed hairs of the aligned reticle rings 107 and 108 are located precisely at the midpoint between them and in the horizontal plane of the longitudinal axis of the missile resting upon the pillow blocks 45 and 46. Thus, when the missile has been adjusted longitudinally so that the total weight on the scale platforms 11, 12 is exactly equal to the total weight on the scale platforms 13, 14, a sighting through the transit telescope 105 and aligned reticle rings 107, 108 will show the exact spot on the side of the missile, midway between the knife edges, where the longitudinal center of gravity is located. The C.G. location may be read through the transit telescope on a graduated scale on the side of the missile, or a scribe may be made on the side of the missile where the intersection of the reticle cross hairs is noted. Alternatively, instead of a transit telescope 105 and aligned reticle rings 107, 108, a projector might be used, which projects a crossed-hair image on the side of the missile.

Also mounted on the ends of the platform 22 are frames 112 and 113, each of which supports a pair of aligned reticle rings 114, 115. The reticle rings 114, 115 are located precisely at the midpoint between the two pairs of longitudinally extending knife edges 34 on the fulcrums 30 of scale platforms 12, 14 on one side, and 11, 13 on the other side. Transit telescopes similar to 105 may be set up at the ends of the platform 22 to sight through the reticle rings 114 and 115, or the telescope 105 and support 106 may be moved to the appropriate locations when the transverse position of the center of gravity is being located.

The two motors, 62 and 90, which are operable to move the pillow blocks 45 and 46 along the longitudinal and transverse axes, respectively, of the frame 22, may be manually controlled by suitable push buttons or valves, as the case may be, or they may be controlled automatically by the scale mechanism 15, 16, 17, 18, 19 and 20, so as to bring the missile to a position of perfect balance on the scale platforms 11, 12, 13 and 14, without attention on the part of the operator. For automatic operation of the motors 62 and 90, the motor controls are actuated by a servomechanism (not shown) in the scale mechanisms 15, 16, 17, 18, 19 and 20, which causes the motors to run in the direction to equalize the load on opposed pairs of scale platforms. The servomechanism is conventional and well known in the art, and therefore it is not deemed necessary to show the same in detail herein.

The operation of our center of gravity locating apparatus 10 is believed to be more or less self-evident from the foregoing description. A missile is laid on the pillow blocks 45 and 46, and the handwheel 60 or motor 62 is operated to shift the pillow blocks along the lengthwise direction until the combined load on scale platforms 11 and 12, as indicated on mechanism 19, is exactly equal to the combined load on scale platforms 13 and 14, as indicated on mechanism 20. When the missile is exactly balanced, a sighting is taken through the transit telescope 105 and aligned reticle rings 107, 108, and the projected intersection of the cross hairs is marked on the side of the missile.

The handwheel 86 or motor 90 is then operated to shift the pillow blocks along the transverse axis of the frame 22 until the combined load on scale platforms 11 and 13 is exactly equal to the combined load on scale platforms 12 and 14. In the event that the weight of the missile is distributed asymmetrically about its longitudinal and transverse axes, it may be necessary to adjust the position of the missile so that diagonally opposed pairs of scale platforms are balanced, i.e., platforms 12 and 13 are balanced and platforms 11 and 14 are balanced. In either case, when the load is balanced on opposed pairs of scale platforms, a sighting is taken through the transit telescope and aligned reticle rings 114 and 115 of the frame 112, to locate the transverse position of the center of gravity. If necessary because of asymmetric weight distribution of the missile, a second sighting can be taken through the aligned reticle rings 114, 115 of frame 113. In each case, the projected intersection of the cross hairs is scribed or noted on the adjacent end of the missile.

The missile is then rotated 90 degrees in the pillow blocks 45, 46, and additional sightings are taken through the end reticles 114 and 115 at one or both ends of the apparatus. This gives the location of the center of gravity of the missile about two perpendicular axes that are transverse to the longitudinal axis of the missile, and with this information, the location of the center of gravity is determined about all three axes with a high degree of accuracy.

The simultaneous determination of both the longitudinal and transverse locations of the center of gravity of the missile is made possible by the unique construction of the fulcrums 30, with their two sets of knife edges 34 and 39 arranged perpendicular to one another and in the same horizontal plane. As each of the fulcrums 30 provides freedom for tilting about two perpendicular axes that intersect in a common plane, the effect is the same as though each of the fulcrums 30 provided a single point of support. Thus, the missile resting on the pillow blocks 45 and 46 can be simultaneously balanced about both its longitudinal and transverse axes.

In order to check the accuracy of the apparatus, we provide a test beam, shown in FIGURES 5, 6 and 7, which will now be described. The test beam is designated in its entirety by the reference numeral 110, and comprises an elongated H-beam made up of top and bottom flanges 111 and 112, with a center web 113. On opposite sides of the beam are two lengthwise extending, parallel grooves 114 and 115, and slidably disposed within these grooves are weights 116 and 117. Each of the weights 116 and 117 is in the form of a rectangular block of iron or steel, which is supported by three rollers 120, that ride in shallow track grooves 121 and 122 in the top and bottom flanges 111 and 112, respectively. The rollers 120 are rotatably supported on axles 123, and are enclosed within slots in the top and bottom sides of the weights 117, as shown in FIG. 7. A locating plunger 125 extends transversely through a hole in each of the weights 117, and is screw-threaded therein for a portion of its length. A knurled head 126 is provided on the outer end of the plunger, for finger tip adjustment.

The inner end of the plunger 125 is adapted to seat in any one of several longitudinally spaced sockets 127, 127a, 127b, 127c or 127d, to lock the weight at any one of these five stations. Scribed in the side of the top flange 111 are five index marks 130 which are arranged in a row parallel to the longitudinal axis of the beam 110 and spaced apart, as shown in FIGURE 6, to designate the different positions of center of gravity of the beam when the weights 116 and 117 are at each of the designated positions along the length of the beam. The weights are shifted from one position to another by unscrewing the plunger 125 until it is clear of the socket 127, and then sliding the weight to the new position, where it is locked in place by screwing the plunger in so that it seats in the associated socket.

Lifting eyes 132 are secured to the top of the beam 110 adjacent the ends thereof, and hooks 133 are also attached to the beam between the eyes 132. Each of the hooks 133 is provided with a downwardly facing V-notched bearing block 134, and these bearing blocks are adapted to be seated on knife edges on two scale platforms for the purpose of establishing the index marks 130 or checking the accuracy thereof. Extremely minute adjustment of the weight or balance of the beam 110 is obtained by adding or subtracting ballast in four cup-shaped cavities 135 in the top of the beam adjacent the ends thereof. The cavities 135 are closed by cover plates 136, and the ballast may be in the form of lead shot or the like.

The beam 110 is placed on the pillow blocks 45, 46, and the apparatus 10 is adjusted to bring the beam into balance on the scale platforms 11, 12, 13 and 14. When the sighting is taken through the transit telescope 105, the reticle cross-hairs should lie directly on the index mark 130 corresponding to the location of the weights 116 and 117. If this is the case, the weights 116, 117 are shifted to another position and the apparatus 10 is readjusted to locate the new position of the center of gravity. This operation is repeated for all positions of the weights 116, 117, and if the apparatus 10 places the reticle cross-hairs precisely on top of the corresponding index mark 130 for each such change, the apparatus 10 is known to be in perfect adjustment and yielding reliable results.

While we have shown and described in considerable detail what we believe to be the preferred form of our invention, it will be understood by those skilled in the art that various changes may be made in the shape and arrangement of the several parts without departing from the broad scope of the invention as defined in the following claims.

We claim:

1. An apparatus for locating the center of gravity of an object along the longitudinal axis thereof, comprising a pair of horizontally spaced apart scale platforms having weighing and indicating mechanisms associated therewith, a stationary platform disposed above said scale platforms, fulcrum means on each of said scale platforms supporting one end of said stationary platform thereon, means mounted upon said stationary platform for supporting said object with its longitudinal axis generally parallel to a line connecting said fulcrum means, said object-supporting means being movable with respect to said stationary platform along a line of travel parallel to said line connecting said fulcrum means, a counterweight mounted on said stationary platform for movement parallel to the line of travel of said object-supporting means, means operable to move said object-supporting means in one direction and said counterweight in the opposite direction at such rates, respectively, as to maintain the center of gravity of said object-supporting means and said counterweight at a fixed point for all adjusted positions thereof, and means positioned midway between said fulcrum means for locating the longitudinal center of gravity of said object on the side thereof when said object has been shifted on said supporting means to the point at which said scale indicating mechanisms for said two scale platforms show identical weight readings.

2. Apparatus for locating the longitudinal center of gravity of an elongated object, comprising a pair of scales having horizontally spaced-apart scale platforms, a frame, fulcrum means on each of said scale platforms supporting one end of said frame, means on said frame to receive and support said object with its longitudinal axis extending between said scale platforms, said object-supporting means being movable with respect to said frame along a path parallel to the longitudinal axis of said object, means for counterbalancing the weight of said object supporting means as the latter is moved along said path so that said scales are unaffected by said movement of said object-supporting means, itself, and optical means mounted on said frame midway between said fulcrum means for indicating the location of the longitudinal center of gravity of said object on the side thereof when said object has been moved to the position on said frame where said scales show an exactly equal distribution of the weight of the object between the two scale platforms.

3. Apparatus as defined in claim 2, wherein said scales have weight indicating means for showing the weight carried by each of said scale platforms, respectively, the sum total of weight shown on said indicating means being the total weight of said object.

4. Apparatus for locating the center of gravity of an elongated object along the longitudinal and transverse axes thereof, comprising two pairs of scale platforms arranged in a rectangular pattern, a stationary platform, fulcrum means for each of said scale platforms supporting one corner of said stationary platform, each of said fulcrum means being tiltable about two axes parallel to said longitudinal and transverse axes, respectively, of said object, means on said frame adapted to receive and support said object with its longitudinal axis generaly parallel to said longitudinal axis of said rectangular pattern, said object-supporting means being movable with respect to said stationary platform along two mutually perpendicular paths extending parallel and transverse, respectively to said longitudinal axis of said rectangular pattern, means for moving said object-supporting means along either of said two paths, means for counterbalancing the empty weight of said object-supporting means as the latter is moved about on said stationary platform so that said scale platforms are unaffected by such movement, means located midway between said two pairs of fulcrum means at opposite ends of said rectangular pattern for projecting the longitudinal center of gravity of said object on one side thereof when said object has been shifted so that the sum total of the scale readings for the scale platforms at one end of said object exactly equals the sum total of the scale readings for the scale platforms at the other end thereof, and other means located midway between the two pairs of fulcrum means on opposite sides of said object for projecting the transverse center of gravity of said object onto the adjacent surface thereof when said object has been shifted so that the sum total of the scale readings for the scale platforms on one side of the object exactly equals the sum total of the scale readings for the object on the other side thereof.

5. Apparatus as defined in claim 4, wherein said means for moving said object-supporting means comprises a first leadscrew supported for rotation about an axis parallel to said longitudinal axis of said rectangular pattern, means providing a driving connection between said leadscrew and said object-supporting means whereby the latter is shifted along said longitudinal axis when said leadscrew is rotated, a second leadscrew supported for rotation about an axis at right angles to the axis of said first leadscrew, means providing a driving connection between said second leadscrew and said object-supporting means whereby the latter is shifted in the direction transverse to said longitudinal axis when said second leadscrew is rotated, and means for rotating said leadscrews.

6. Apparatus for locating the center of gravity of an elongated object along the longitudinal and transverse axes thereof, comprising two pairs of scale platforms arranged in a rectangular pattern, each of said scale platforms having weighing and indicating mechanisms associated therewith, a stationary platform of rectangular configuration disposed above said scale platforms, fulcrum means on each of said scale platforms supporting one corner of said stationary platform, each of said fulcrum means being tiltable about two axes parallel to said longitudinal and transverse axes, respectively, of said object, a pair of spaced-apart pillow blocks shaped to receive and hold said object with its longitudinal axis generally parallel to said longitudinal axis of said rectangular pattern, said pillow blocks being connected together and being movable as a unit, a truck supporting each of said pillow blocks, each of said pillow blocks being movable on its respective truck in the direction transverse to the longitudinal axis of said object, a counterweight mounted on each of said trucks for movement parallel to the line of travel of its respective pillow block, means operable to move both of said pillow blocks in one direction and their respective counterweights in the opposite direction so as to maintain the center of gravity of said pillow blocks and said counterweights at a fixed transverse location for all adjusted positions thereof, said trucks being movable on said stationary platform in the direction parallel to the longitudinal axis of said object, another counterweight mounted on said stationary platform for movement parallel to the line of travel of said trucks, means operable to move said trucks in one direction and said other counterweight in the opposite direction so as to maintain the center of gravity of said trucks and said other counterweight at a fixed longitudinal location for all adjusted positions thereof, means located midway between the two pairs of fulcrum means at opposite ends of said object for locating the longitudinal center of gravity of said object on one side thereof when said object has been shifted on said trucks to the point where said indicating mechanisms for the two scale platforms at one end of said stationary platform show total weight readings exactly equal to the total weight readings of the two scale platforms at the other end, and other means located midway between the two pairs of fulcrum means on opposite sides of said object for locating the transverse center of gravity of said object on an adjacent surface thereof when said object has been shifted on said pillow blocks to the point where said indicating mechanisms for the scale platforms on one side of said stationary platform show total weight readings exactly equal to the total weight readings of the scale platforms on the other side thereof.

References Cited by the Examiner

UNITED STATES PATENTS

| | | | |
|---|---|---|---|
| 1,735,517 | 11/1929 | Taylor | 73—65 |
| 2,714,536 | 8/1955 | Wirth | 308—2 |
| 2,746,814 | 5/1956 | Van Duyn | 308—2 |
| 2,782,631 | 2/1957 | Baltrukonis et al. | 73—65 |
| 2,819,612 | 1/1958 | Borgstrom et al. | 73—65 |
| 2,932,188 | 4/1960 | Kennedy | 73—65 |
| 2,958,216 | 11/1960 | Perls et al. | 73—1 |
| 3,005,332 | 10/1961 | McClintock | 73—1 |

LOUIS R. PRINCE, *Primary Examiner.*

ROBERT L. EVANS, JOSEPH P. STRIZAK, RICHARD QUEISSER, *Examiners.*